Oct. 17, 1950  E. M. NOWLIN  2,526,396
ROTARY PULVERIZING AND GRADING MACHINE
Filed Oct. 7, 1944   4 Sheets-Sheet 1
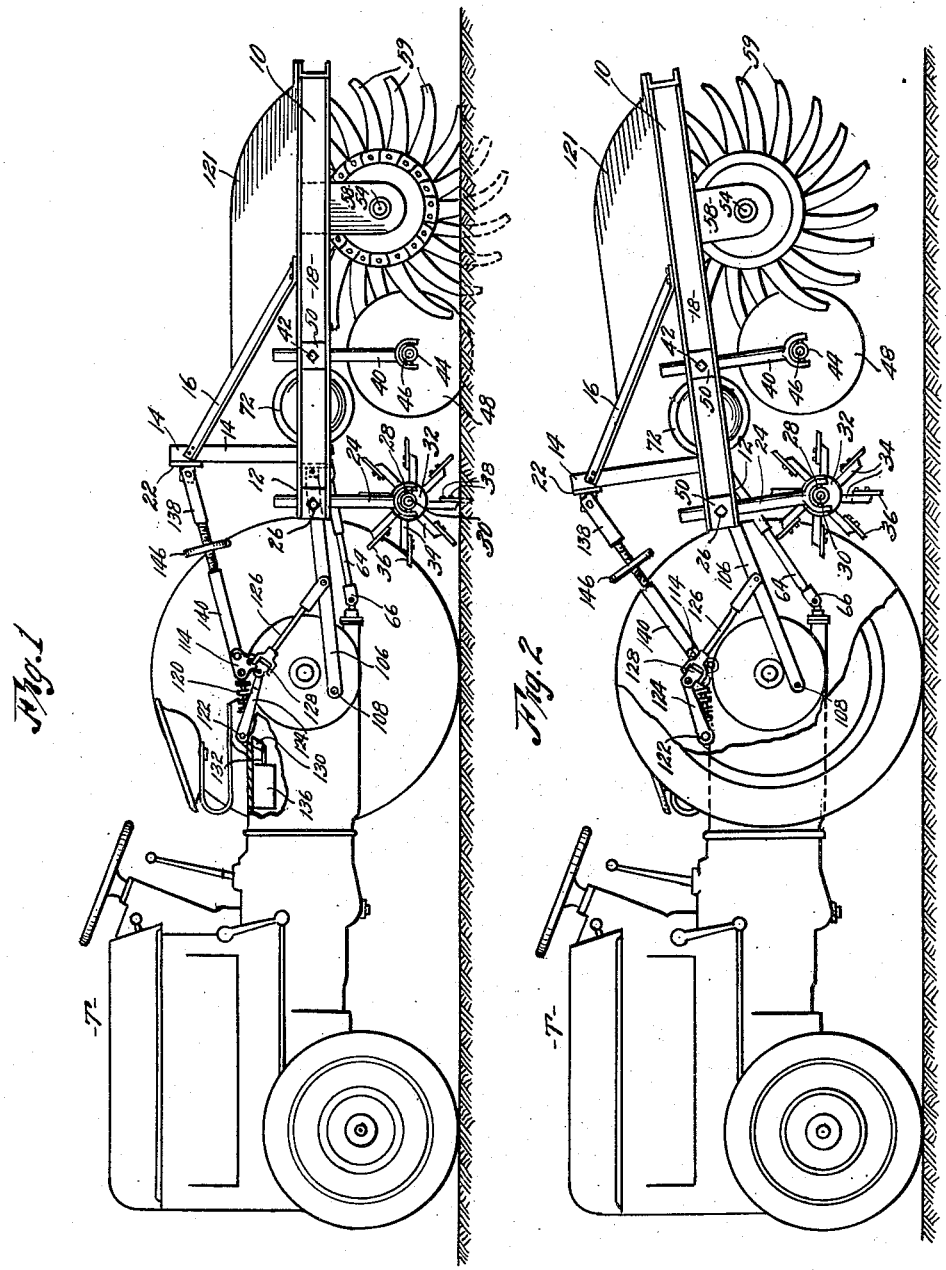
INVENTOR,
Edward M. Nowlin.
BY Roy E. Hamilton,
Attorney.

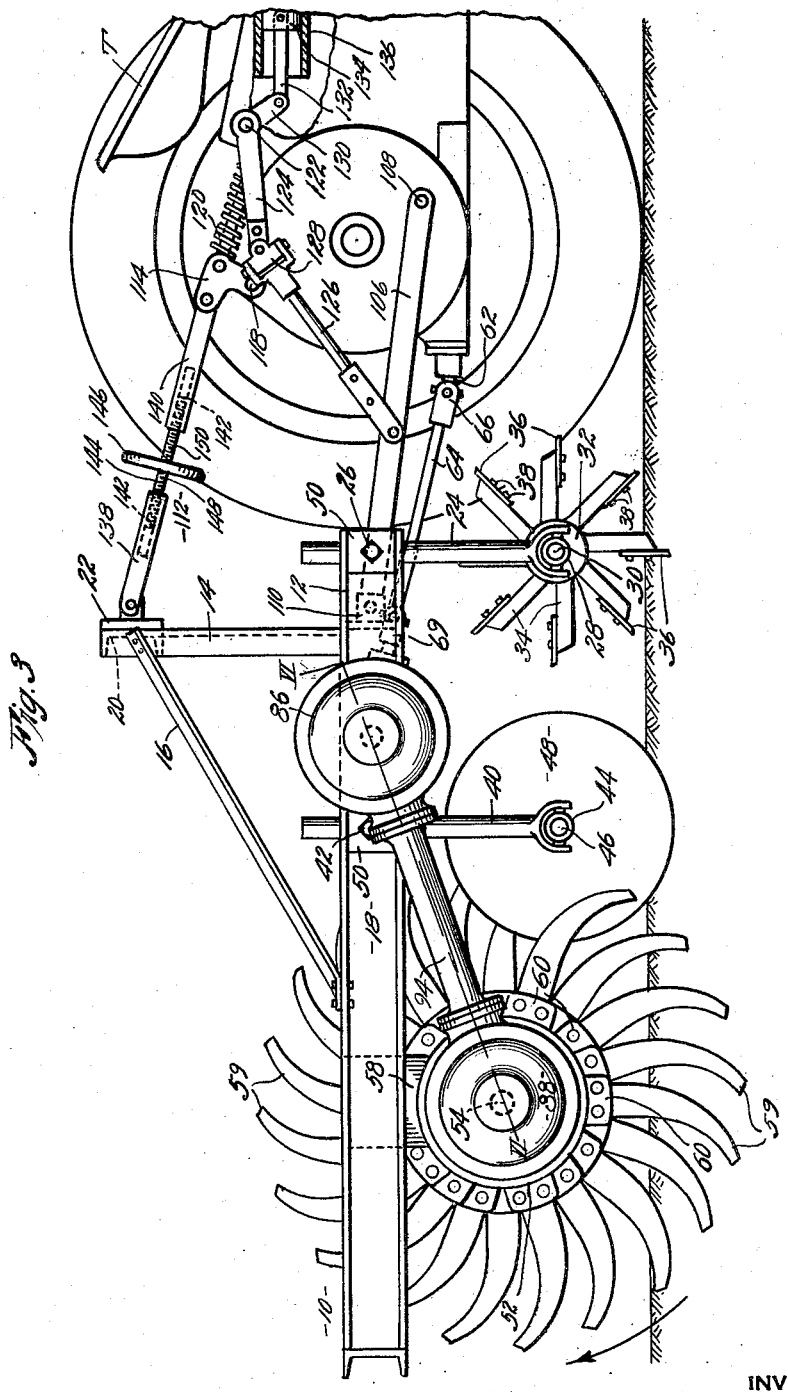

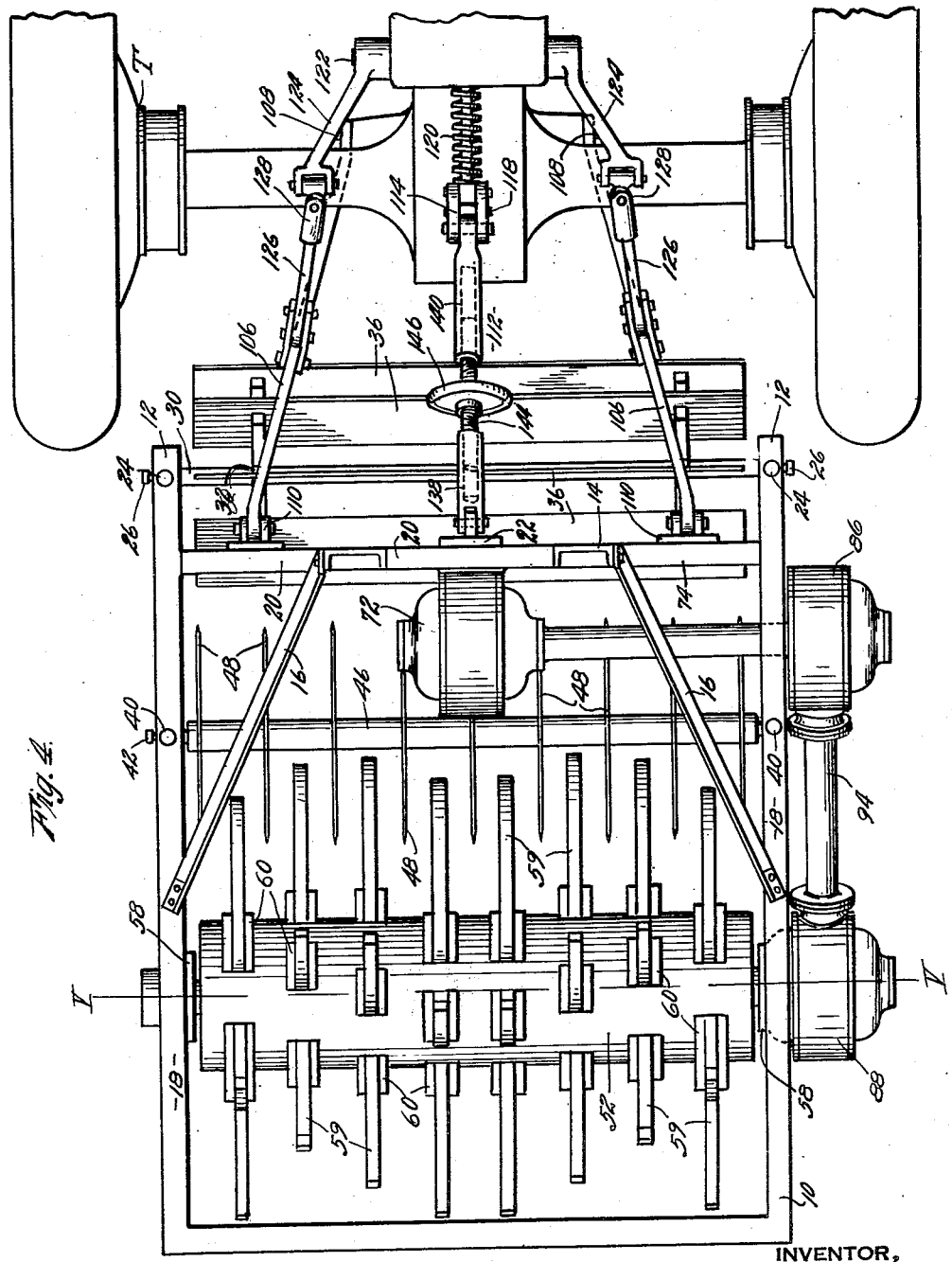

Oct. 17, 1950 E. M. NOWLIN 2,526,396
ROTARY PULVERIZING AND GRADING MACHINE
Filed Oct. 7, 1944 4 Sheets-Sheet 4
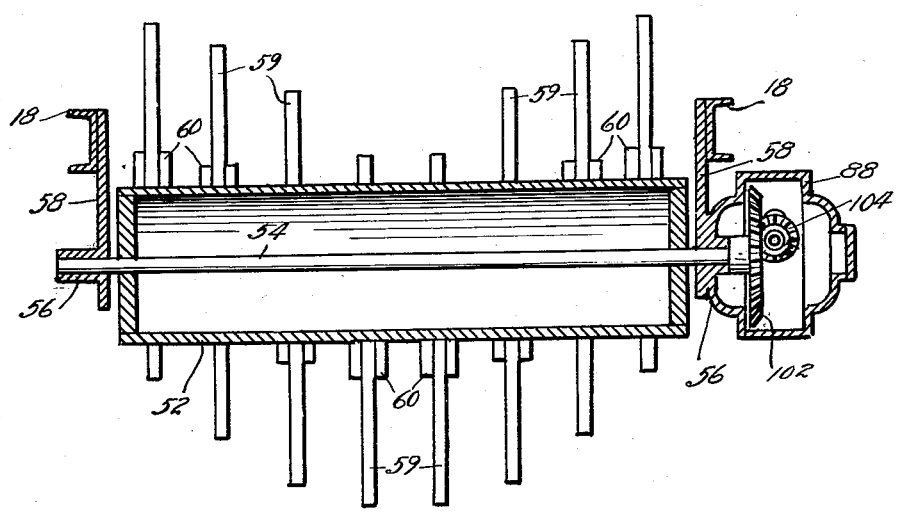
Fig. 5
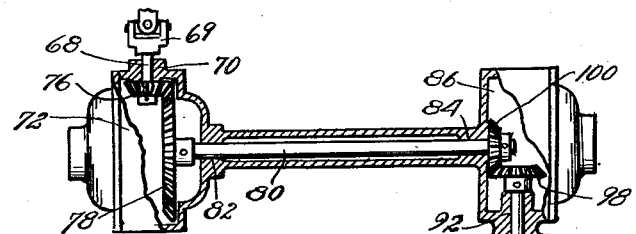
Fig. 6
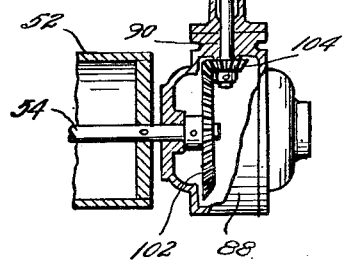
INVENTOR,
Edward M. Nowlin.
BY Roy E. Hamilton,
Attorney.

Patented Oct. 17, 1950

2,526,396

UNITED STATES PATENT OFFICE 2,526,396

ROTARY PULVERIZING AND GRADING MACHINE

Edward M. Nowlin, Kansas City, Mo.

Application October 7, 1944, Serial No. 557,680

1 Claim. (Cl. 97—40)

This invention relates to improvements in rotary pulverizing and grading machines and has particular reference to that type of machine adapted for use with a farm tractor for farm use and for road grading.

The principal object of the present invention is the provision of a rotary type pulverizing and grading apparatus for use in combination with a tractor having hitching means suitable for supporting said apparatus in various fixed positions relative thereto.

A further object of this invention is the provision of a pulverizing and grading attachment having two sets of cutters whereby the earth being worked is cut transversely and longitudinally of the direction of travel of the machine and also having a toothed power driven drum adapted to follow said cutting members to pulverize the earth.

Another object is the provision of a pulverizing and grading attachment carried by a power vehicle and having attaching means operable to adjust said pulverizing and grading attachments to and from the ground engaging position.

Other objects are simplicity and compactness of structure, ease and efficiency of operation and adaptability for varying the relative depth of cut of the various ground working units.

With these objects in view as well as other objects which will appear during the course of the specification, reference will now be had to the drawing wherein:

Figure 1 is a side elevation of a rotary pulverizing and grading machine, hitched to a power driven vehicle and embodying this invention.

Fig. 2 is a figure similar to that shown in Fig. 1 with parts broken away and with the ground working attachment raised above the ground surface.

Fig. 3 is an enlarged side elevational view of the ground working attachment and hitched mechanism.

Fig. 4 is a plan view of the parts shown in Fig. 3.

Fig. 5 is a vertical sectional view taken on line V—V of Fig. 4, with some of the parts omitted.

Fig. 6 is a sectional view of the train of gears for driving the toothed drum taken on line VI—VI of Fig. 3, with some parts in elevation.

Throughout the several views like reference characters refer to similar parts and the numeral 10 designates a rectangular frame having forwardly disposed extensions 12 and a vertically disposed standard 14 at its forward end. Said standard having brace angles 16 by means of which it is secured to the side rails 18 of the frame 10. The head cross member 20 of standard 14 is provided with a centrally disposed hitch block 22. A pair of vertically disposed standards 24 slidably mounted respectively in side rails 18 and secured thereto by means of set screws 26, each carry a bearing member 28 in which is rotatably mounted a transverse shaft 30 having fixed hubs 32 on which is mounted substantially radially disposed arms 34. The arms of hubs 32 are in transverse alignment so that corresponding arms serve to carry transverse blades 36 which are removably attached thereto by bolts 38. When the machine is in the operative position, the blades 36 are free to rotate and consecutively contact and cut the earth to a depth determined by the setting of the standards 24. Standards 40 carried by side rails 18 and removably secured thereto by set screw 42 carry at their lower ends respectively a bearing 44 in which is rotatably mounted a shaft 46 carrying cutting discs 48. These discs 48 are disposed in an equally spaced series and serve to slit the earth into strips in the direction of travel of the machine.

In order to provide a suitable bearing for the standards 24 and 40, blocks 50 are made integral with the side rails 18 to receive said standards therethrough. It will be noted that the set screws 26 and 42 are mounted in these blocks.

To the rear of the series of cutting discs 48 is a power driven toothed drum 52 which is provided with an axle 54 rotatably mounted in bearings 56 carried by depending brackets 58 which are securely fixed to side rails 18. The teeth 59 are rigidly fixed to the periphery of drum 52 by means of brackets 60 and extend substantially radially therefrom to engage the ground to be worked. The outer extremity of each tooth 59 is inclined forwardly in the direction of travel which is the direction indicated by the arrow in Fig. 3. Referring to Figs. 3 and 4, it will be noted that the teeth 59 at the opposite sides of the transverse center line of drum 52 are disposed in a helical line about the periphery of the drum but in opposite directions. This positioning of the teeth on the drum insures an even central draft on the drum, and also presents a tooth at each end portion of the drum to the ground surface at even and regular intervals thus insuring a relatively even pull on the draw bars at all times.

The cutter discs 48 are so positioned as to extend between adjacent teeth 59 of drum 52, so that the teeth will serve to prevent the accumulation of trash between the cutter discs, furthermore with these parts interlapping the machine is more compact and required pulling force is reduced.

The drive mechanism for drum 52 comprises the well known power take-off shaft 62 of a motor driven vehicle such as a tractor T. This take-off shaft drives an extensible shaft 64 through a universal joint 66, and this extensible shaft 64 is interconnected by universal joint 69 with a shaft 68 mounted in bearings 70 which is integral with housing 72 which in turn is securely welded or otherwise attached to the cross bar 74 of frame 10. A bevel pinion 76 secured to shaft 68 in housing 72 meshes with bevel gear 78, which is rigidly secured to transverse shaft 80. This shaft 80 is mounted for rotation in bearings 82 and 84 in housings 72 and 86 respectively. Housing 86 is interconnected with housing 72 by an elongated tubing and is secured to side rail 18 in any suitable means. A gear housing 88 carried by bracket 58 is provided with a bearing 90 which is in axial alignment with a bearing 92 carried by housing 86, and these housings are joined together by means of a tubular shield 94. A shaft 96 extends from housing 86 to gear housing 88 to rotate in bearings 90 and 92 and is provided with a bevel gear 98 to mesh with bevel gear 100 secured to the outer end of shaft 80. Mounted to axle 54 is a bevel gear 102 which inter-meshes with a bevel pinion 104 rigidly carried by shaft 96.

When the vehicle motor is running to drive the power take-off the train of gears just described will transmit driving power to the drum axle 54, whereby the teeth 59 are rotated to engage the earth surface. The peripheral speed of the teeth 59 is preferably greater than the forward speed of the machine, thus producing a tearing effect as the teeth pass through the earth. It is quite apparent that the action of the teeth against the earth in the direction indicated by the arrow will tend to move the frame and its associated ground working parts forward, thus relieving the tension on the draw bars. The speed of rotation of the toothed drum relative to the ground speed of the machine may be varied by changing the gear ratios of the driving parts.

The hitch mechanism by means of which the pulverizing and grading mechanism is attached to the tractor T, comprises the draw bars 106 which are pivoted to the tractor at 108 and to the block 110 which is rigidly secured to the cross bar 74 of frame 10. These draw bars serve to pull the implement and in conjunction with top bar or link 112 serve to support the implement in any predetermined vertical position. Top bar 112 is pivoted at its one end to hitch block 22 and at its other end to a lever 114 pivoted to the tractor T by means of a pin 118. Lever 114 is provided with a compression spring 120 which serves to measure the reaction forces applied to top bar 112 by the earth engaging parts of the implement and to automatically regulate the action of hydraulic mechanism (not shown) for controlling the following lift means. This lift means includes a transverse shaft 122 rotatably carried by the tractor and provided at its opposite ends with lever arms 124 to which are respectively attached one end of lift rod 126 which are pivotally secured at their other ends to the adjacent draw bar 106. A universal joint 128 for joining lever arm 124 with lift rod 126 serve to compensate for irregular movements of the interconnected parts. A lever 130 rigidly attached to shaft 122 is connected at its free end to a piston rod 132 which in turn is connected to a piston 134 operatively positioned in a ram cylinder 136. This piston is adapted to be operated by the flow of a liquid to and from cylinder 136 which is controlled by the operator through any suitable means (not shown). The general construction of this hitch mechanism is old and now in general use; however, a new feature is the special top bar 112 which comprises two sections 138 and 140, each hollow and threaded at 142 to receive the connecting member 144 which is provided adjacent its central portion with an operating hand wheel 146. The threads 148 and 150 at opposite end portions connecting member 144 are respectively right and left handed so that when the hand wheel is operated, the bar sections will be forced apart or drawn together to regulate the vertical position of the ground engaging parts of the implement.

When it is desired to increase the depth of cut of the teeth 59 the top bar is lengthened and is shortened when it is desired to decrease the depth of cut.

Referring to Figs. 1 and 2 in which the implement or ground working tools are shown in the ground engaging position and in the raised inoperative position, it will observed that the implement is carried by the draw bars 106 and top bar 112 regardless of whether it is in the ground or raised therefrom. Should it be desired to increase the depth of cut of the tools, the operator simply lengthens the top bar by turning hand wheel 146. By reversing the direction of rotation of hand wheel 146, the depth of cut of the tools can be lessened. Due to the position of spring 120 it is apparent that it will be compressed to different degrees due to the variation of backward pressure against top bar 112 which holds the working tools in position in the ground. For safety, a cover 121 may be provided for the toothed drum.

This combination of the ground working tools with the power driven vehicle is such that the tools are easily controlled and regulated by the operator seated on the vehicle. Furthermore, the tools are attached sufficiently close to the vehicle to maintain the tools at a substantially uniform depth of operation and to carry the tools in the inoperative positions without upending the vehicle.

While the tools are shown in combination with one of the well known wheel type tractors, it is quite obvious that the implement might be used with any of the various types of tractors without any material change in structure or operation.

Having thus described the invention, what I claim as new and desire to be secured by Letters Patent is:

A pulverizing and grading machine comprising a frame, means carried by a power driven vehicle for supporting said frame above the ground surface, a power take-off operable by said power driven vehicle, a rotatably mounted drum having radially disposed ground engaging teeth carried by said frame adjacent its rear end, means interconnecting said drum with said power take-off to drive said drum whereby the peripheral speed of said drum teeth is greater than the ground speed of said power driven vehicle, spaced apart cutter discs positioned in planar alignment with the direction of travel of said machine and carried by the center portion of said frame and adapted to rotate when in contact with the ground as said machine is moved, said discs being disposed in interengaging relation with said teeth, a member having a series of circumferentially disposed transverse blades rotatably carried by said frame forwardly of said cutter discs and adapted to penetrate the ground being traversed, means automatically adjustable to vary said frame supporting means whereby said frame is maintained substantially horizontal, and adjustable means to vary the relative positions of said cutter discs and said transverse blades relative to said frame.

EDWARD M. NOWLIN.

REFERENCES CITED

The following references are of record in the file of this patent:

UNITED STATES PATENTS

| Number | Name | Date |
|---|---|---|
| 142,094 | Elliston | Aug. 26, 1873 |
| 507,894 | Emans | Oct. 31, 1893 |
| 541,411 | Allerton et al. | June 18, 1895 |
| 1,005,697 | Diestelmeier et al. | Oct. 10, 1911 |
| 1,008,708 | Eidem | Nov. 14, 1911 |
| 1,084,478 | Peterson | Jan. 13, 1914 |
| 1,659,090 | Emmons | Feb. 14, 1928 |
| 2,118,180 | Ferguson | May 24, 1938 |

FOREIGN PATENTS

| Number | Country | Date |
|---|---|---|
| 198,630 | Switzerland | Sept. 16, 1938 |